(12) United States Patent
Hrdina et al.

(10) Patent No.: US 8,261,578 B2
(45) Date of Patent: Sep. 11, 2012

(54) HYDROGEN LOADING OF NEAR NET SHAPE OPTICS

(75) Inventors: Kenneth Edward Hrdina, Horseheads, NY (US); Michael A Mueller, Roth-Eckersmuehlen (DE); Susan Schiefelbein, Ithaca, NY (US)

(73) Assignee: Corning Incorporated, Corning, NY (US)

( * ) Notice: Subject to any disclaimer, the term of this patent is extended or adjusted under 35 U.S.C. 154(b) by 838 days.

(21) Appl. No.: 12/258,703

(22) Filed: Oct. 27, 2008

(65) Prior Publication Data

US 2009/0110899 A1   Apr. 30, 2009

Related U.S. Application Data

(60) Provisional application No. 61/001,267, filed on Oct. 31, 2007.

(51) Int. Cl.
*C03C 15/00* (2006.01)
*C03C 3/06* (2006.01)
*C03B 19/06* (2006.01)
*C03B 37/018* (2006.01)

(52) U.S. Cl. ............ 65/30.1; 65/17.4; 65/414; 65/416; 65/421; 501/54

(58) Field of Classification Search ............... 501/53, 501/54; 65/17.4, 30.1, 32.1, 66, 111, 414, 65/416, 421, 427
See application file for complete search history.

(56) References Cited

U.S. PATENT DOCUMENTS

| | | | |
|---|---|---|---|
| 6,810,687 B2 * | 11/2004 | Nishimura et al. | 65/29.15 |
| 6,946,416 B2 * | 9/2005 | Maxon et al. | 501/54 |
| 7,589,040 B2 * | 9/2009 | Dawes et al. | 501/54 |
| 2002/0194869 A1 | 12/2002 | Borrelli et al. | |
| 2007/0066477 A1 | 3/2007 | Harper et al. | |

* cited by examiner

*Primary Examiner* — Noah Wiese
(74) *Attorney, Agent, or Firm* — Robert P. Santandrea

(57) ABSTRACT

A method of making a fused silica article that is loaded with hydrogen. A fused silica glass near net shape part is provided and is loaded with a molecular hydrogen in a range from about $0.1 \times 10^{17}$ molecules/cm$^3$ up to about $1 \times 10^{19}$ molecules/cm$^3$. The thinner shape of the near net shape part enables the shape to be loaded more quickly than previous methods. A fused silica article loaded with hydrogen using the method is also described.

25 Claims, 12 Drawing Sheets

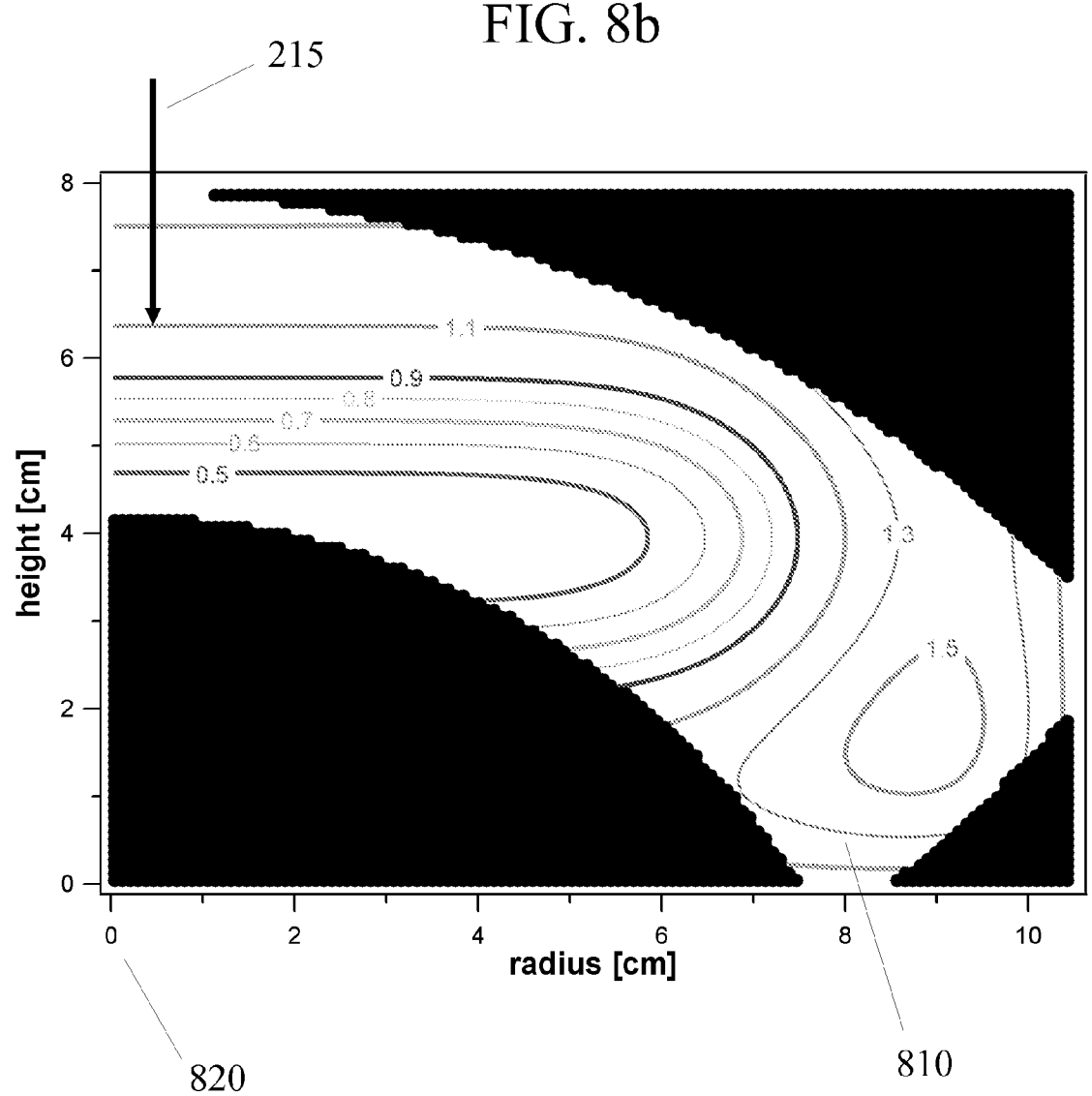

HYDROGEN LOADING OF NEAR NET SHAPE OPTICS

CROSS-REFERENCE TO RELATED APPLICATIONS

This application claims the benefit of priority under 35 U.S.C. §119(e) of U.S. Provisional Application Ser. No. 61/001,267 filed on Oct. 31, 2007.

BACKGROUND

The invention relates to high purity fused silica glass. More particularly, the invention relates to loading high purity fused silica glass with molecular hydrogen. Even more particularly, the invention relates to a method of loading high purity fused silica glass with molecular hydrogen.

Fused silica glass is used in the semiconductor industry, forming optical components for photolithographic applications. Fused silica glass transmits at wavelengths of less than or equal to 250 nm and has a high level of optical homogeneity. Exposure to laser radiation at these short wavelengths, however, causes damage to the glass and shortens the lifetime of the optics. To increase the resistance of the glass to radiation damage, fused silica is loaded with molecular hydrogen ($H_2$) using a diffusion process.

At high temperatures, hydrogen and silica react to form silicon hydride, which adversely affects laser damage performance, in the form of increased laser-induced wavefront distortion (LIWFD), and increased fluence dependent transmission (FDT). To minimize the effects of this reaction, hydrogen loading is usually carried out at temperatures of less than 500° C. Consequently, long loading times are needed to diffuse enough hydrogen into the glass to achieve acceptable $H_2$ levels. Depending on the thickness of the part and the desired hydrogen distribution, hydrogen loading may take several months. Means to accelerate the hydrogen loading process, such as creating steep hydrogen gradients or using variable hydrogen surface concentrations, have been investigated.

SUMMARY

The present invention provides a method of making a fused silica article that is loaded with hydrogen. A fused silica glass near net shape is provided and is loaded with a molecular hydrogen concentration in a range from about $0.1 \times 10^{17}$ molecules/cm$^3$ up to about $1 \times 10^{19}$ molecules/cm$^3$. The thinner shape of the near net shape part enables the part to be loaded more quickly than previous methods. A fused silica article loaded with hydrogen using the method is also described.

Accordingly, one aspect of the invention is to provide a method of making a fused silica article. The method comprises: providing a near net shape of the fused silica article; loading the near net shape with a hydrogen concentration in a range from about $0.1 \times 10^{17}$ molecules/cm$^3$ up to about $1 \times 10^{19}$ molecules/cm$^3$; and finishing the near net shape after loading the near net shape with hydrogen to form the fused silica article.

A second aspect of the invention is to provide a method of loading a fused silica near net shape with hydrogen. The method comprises the steps of: providing the near net shape; exposing the near net shape to a first hydrogen pressure for a first time period, wherein hydrogen diffuses into the near net shape; and reducing the first hydrogen pressure to a second hydrogen pressure; and exposing the near net shape to the second hydrogen pressure for a second time period, wherein the second time period is sufficient to load a region of the near net shape with a hydrogen concentration in a range from about $0.1 \times 10^{17}$ molecules/cm$^3$ up to about $1 \times 10^{19}$ molecules/cm$^3$.

A third aspect of the invention is to provide a method of making a fused silica article. The method comprises: providing a near net shape of the fused silica article; exposing the near net shape to a first hydrogen pressure for a first time period, wherein hydrogen diffuses into the near net shape; reducing the first hydrogen pressure to a second hydrogen pressure; exposing the near net shape to the second hydrogen pressure for a second time period; and finishing the near net shape to form the fused silica article. The first and second predetermined time periods are sufficient to provide a region of the fused silica article with a hydrogen concentration of in a range from about $0.1 \times 10^{17}$ molecules/cm$^3$ up to about $1 \times 10^{19}$ molecules/cm$^3$, and the fused silica article has an index homogeneity of less than about 5 ppm over an area of at least about 25 cm$^2$.

A fourth aspect of the invention is to provide a fused silica article. The fused silica article has a hydrogen concentration in a range from about $0.1 \times 10^{17}$ molecules/cm$^3$ up to about $1 \times 10^{19}$ molecules/cm$^3$ and an index homogeneity of less than about 5 ppm over an area of at least about 25 cm$^2$, wherein hydrogen has been loaded into a near net shape of the fused silica article.

A fifth aspect of the invention is to provide a fused silica article. The fused silica article has a hydrogen concentration in a range from about $0.1 \times 10^{17}$ molecules/cm$^3$ up to about $1 \times 10^{19}$ molecules/cm3 and an index homogeneity of less than about 5 ppm over an area of at least about 25 cm$^2$, wherein hydrogen has been loaded into the fused silica article by providing a near net shape of the fused silica article; loading the near net shape with a hydrogen concentration in a range from about $0.1 \times 10^{17}$ molecules/cm$^3$ up to about $1 \times 10^{19}$ molecules/cm$^3$; and finishing the near net shape after loading the near net shape with hydrogen to form the fused silica article.

These and other aspects, advantages, and salient features of the present invention will become apparent from the following detailed description, the accompanying drawings, and the appended claims.

BRIEF DESCRIPTION OF THE DRAWINGS

FIG. 3b is a schematic representation of hydrogen concentration profiles calculated for a meniscus lens cut from the loaded blank shown in FIG. 3a;

FIG. 8b is a plot of hydrogen concentration profiles calculated for a meniscus lens cut from the loaded blank shown in FIG. 8a;

DETAILED DESCRIPTION

Figure 1:
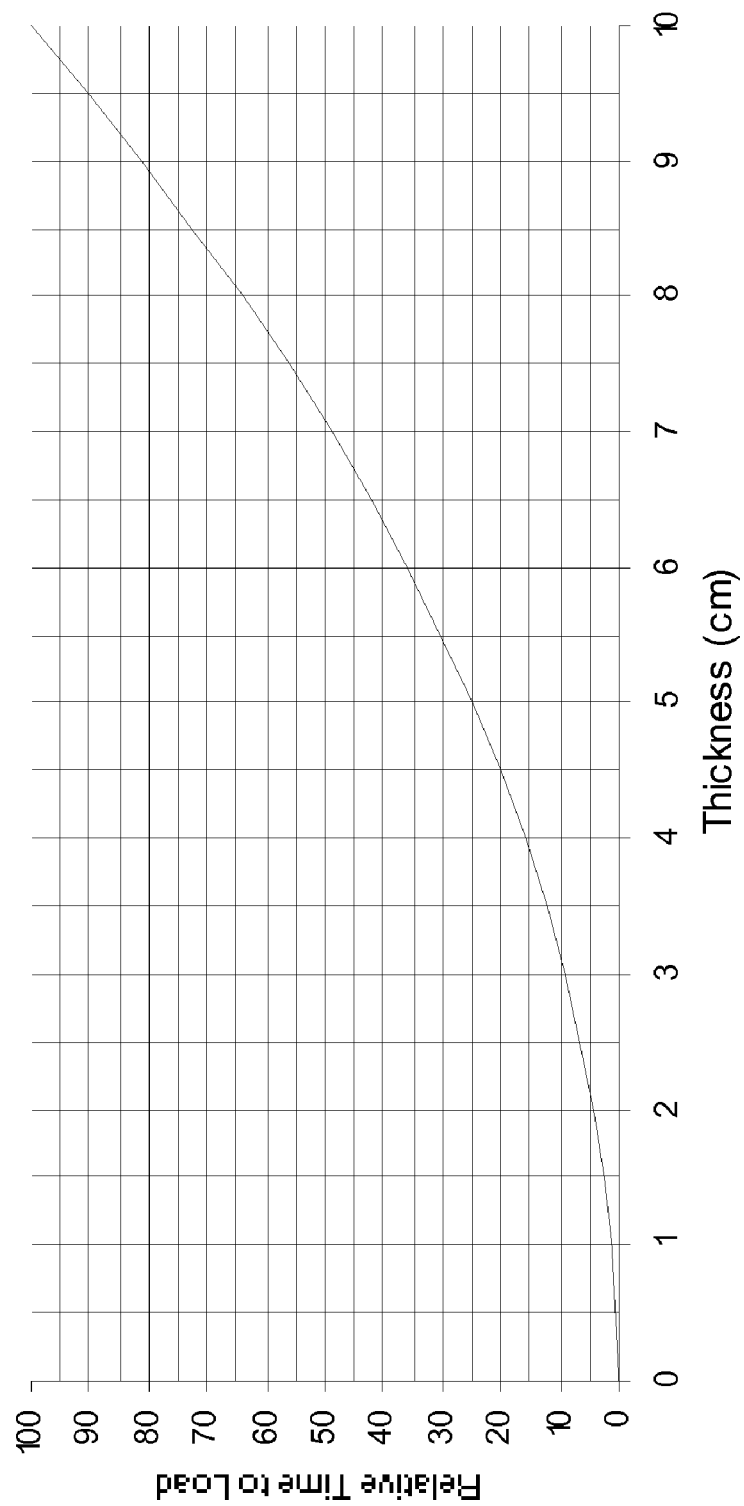
FIG. 1 is a plot of the relative time required to load a fused silica glass part having a planar geometry with hydrogen as a function of thickness of the part.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and/or combinations thereof, it is understood that the group may comprise any number of those elements recited, either individually or in combination with each other. Similarly, whenever a group is described as consisting of at least one of a group of elements and/or combinations thereof, it is understood that the group may consist of any number of those elements recited, either individually or in combination with each other. Unless otherwise specified, a range of values, when recited, includes both the upper and lower limits of the range.

As used herein, the terms "hydrogen" refers to molecular hydrogen ($H_2$), unless otherwise specified, and includes any combination of the naturally occurring isotopes protium and deuterium that form molecular hydrogen (e.g., $H_2$, HD, and $D_2$, where H represents protium and D represents deuterium). As used herein, $n(H_2)$ refers to the total concentration of hydrogen molecules, expressed in molecules/cm$^3$ in a material.

As used herein, the terms "near net shape" and "near net shape part" refer to a shaped part that is close to its final—or net—shape, and does not need much machining in its finishing operation, and are equivalent terms and used interchangeably.

As used herein, the terms "refractive index" and "index of refraction" are equivalent terms and are used interchangeably. The term "index homogeneity" refers to the differences in refractive index as determined from PV (peak to valley), or maximum ("peak") and minimum ("valley"), values of refractive indices measured over the required aperture.

Referring to the drawings in general and to FIG. 1 in particular, it will be understood that the illustrations are for the purpose of describing a particular embodiment of the invention and are not intended to limit the invention thereto.

In order to increase the resistance of fused silica glasses to radiation damage due to laser exposure, such glasses are typically loaded with various isotopes of hydrogen ($H_2$). Hydrogen can be readily diffused into fused silica glass. However, increased concentrations of silicon hydride (SiH*) at loading temperatures greater than 700° C. limit the loading process. SiH* is formed by the thermal reaction of $H_2$ with the lattice:

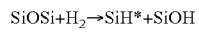

SiOSi+$H_2$→SiH*+SiOH

This general reaction is highly dependent on the glass composition, loading time, and loading temperature. In particular, any appreciable presence of SiH* is undesirable for 193 nm ArF optics. The presence of SiH* leads to degradation of the fused silica, causing decreased transmission, transient absorption, increased fluence dependent transmission (FDT), and laser induced wave front distortion (LIWFD). It is therefore desirable to provide the fused silica optical component with the proper hydrogen concentration and to select loading times and temperatures to obtain the most desirable attributes in high purity fused silica optical components while minimizing the formation of SiH*.

In order to minimize such adverse reactions between fused silica and hydrogen, hydrogen loading of fused silica is therefore typically carried out at temperatures less than about 500° C. Due to low loading temperatures, the time needed to diffuse a sufficient amount of hydrogen into a fused silica glass part may be very long, with the actual time necessary to load a part with $H_2$ depending on the desired hydrogen distribution and thickness of the part. In some instances, for example, loading times are on the scale of several months. It is therefore desirable to reduce the time needed to load fused silica glass parts with hydrogen. It is also desirable to provide the fused silica part with a uniform loading or concentration of hydrogen throughout the fused silica part, particularly within the optical path—i.e., the path along which radiation travels through the part—of the part.

The time needed to load fused silica parts depends on the diffusion of hydrogen into the fused silica glass part. Thus, the loading time depends on temperature, thickness, and geometry of the part. The relative time required to load a fused silica glass part having a planar geometry with a thickness ranging from 0 cm to 10 cm is plotted as a function of thickness in FIG. 1. Relative loading times are plotted to account for different methods that may be used to load the fused silica part.

Hydrogen loading is currently practiced by cutting a rectangular or cylindrical piece—or "blank"—of fused silica glass from a large boule, loading the glass with hydrogen, and then machining the optical member from the hydrogen loaded piece. As used herein, the term "boule" includes any silica-containing body formed by a synthetic process. The hydrogen loaded blank is shaped by processes known in the art, such as cutting, grinding, polishing, and the like to form a near net shape part. Examples of typical near net shape geometries formed from a fused silica blank include, but are not limited to, a concave optical element, a convex optical element, or a meniscus optical element, having a concave surface and a convex surface.

Figure 2:
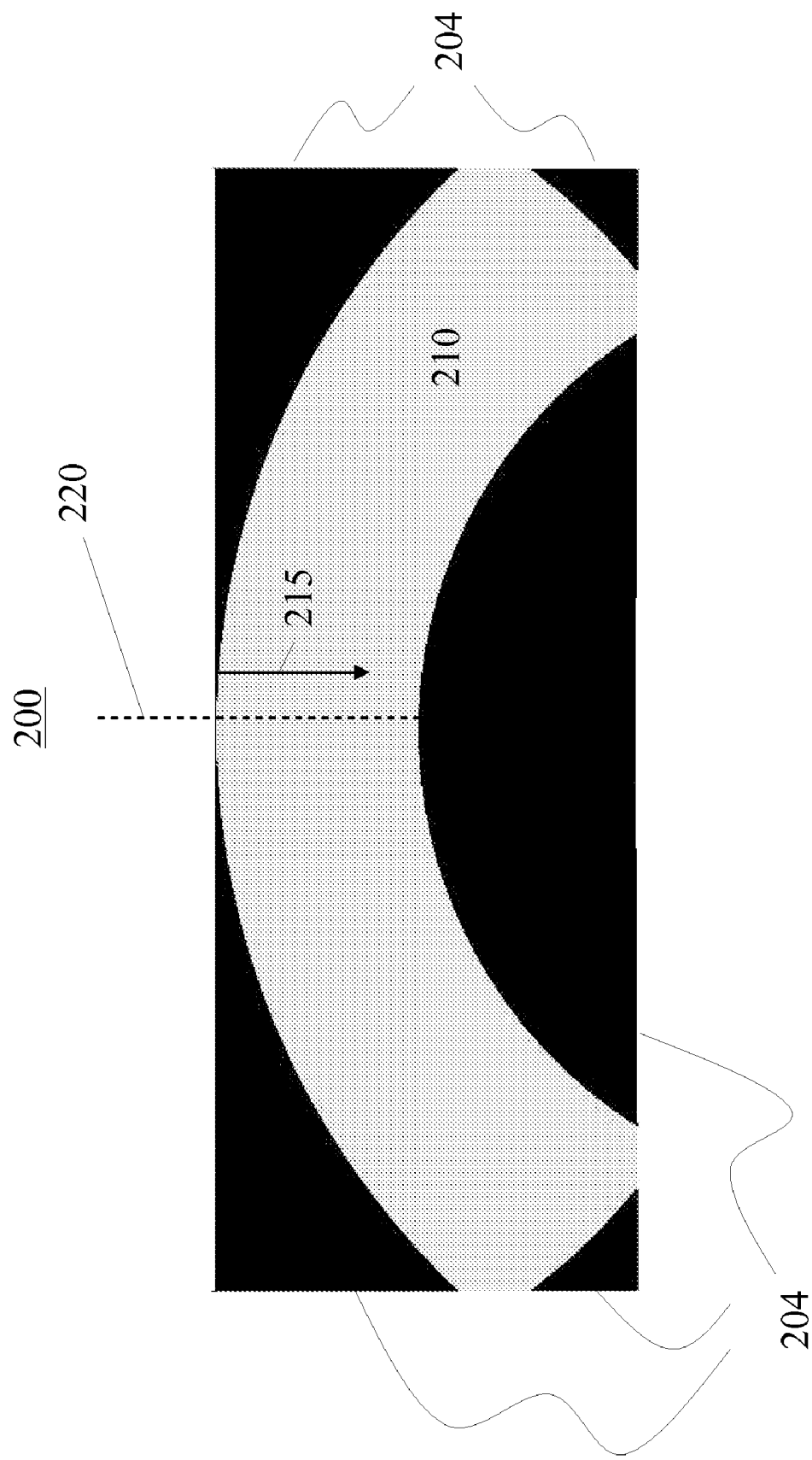
FIG. 2 is a cross-sectional view of a fused silica blank and a meniscus lens formed therefrom.

A cross-sectional view of a fused silica blank and a meniscus lens formed therefrom is shown in FIG. 2. Blank 200 is a right circular cylinder. Extraneous portions 202, 204, 206, and 208 are machined away to obtain near net shape meniscus lens 210. During use, laser radiation passes through the finished lens in use direction 215.

When a fused silica glass part is cut from a larger hydrogen loaded fused silica glass blank, as previously described, the distribution of hydrogen—and the index homogeneity—in the part will reflect that of the loaded blank from which the part is cut. Hydrogen concentration profiles for the loaded blank 200 and meniscus lens 210 (FIG. 2) cut from blank 200 were calculated using a hydrogen diffusion-reaction model. The model predicts the concentration of $H_2$ in a fused silica sample. Given a description of the fused silica sample, including sample dimensions and initial $H_2$, OH, and defect concentrations and details of the hydrogen loading conditions, such as time steps specifying temperature and surface concentration, the model calculates $H_2$ concentrations throughout the sample and enables the accurate prediction of loading time and final $H_2$ concentration profiles.

Figure 3A:
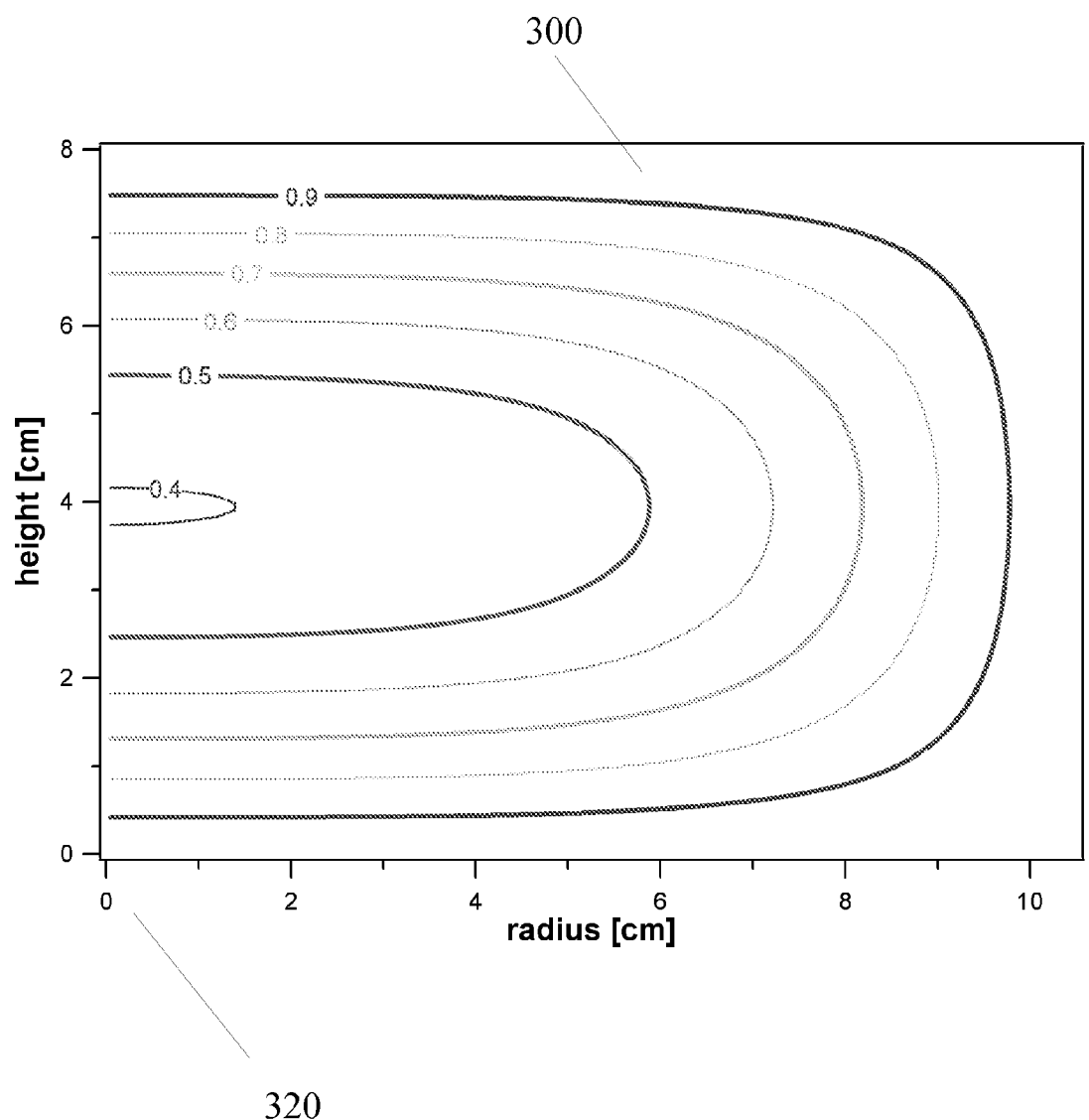
FIG. 3a is a schematic representation of hydrogen concentration profiles calculated for a blank loaded under a constant hydrogen pressure.
Figure 3B:
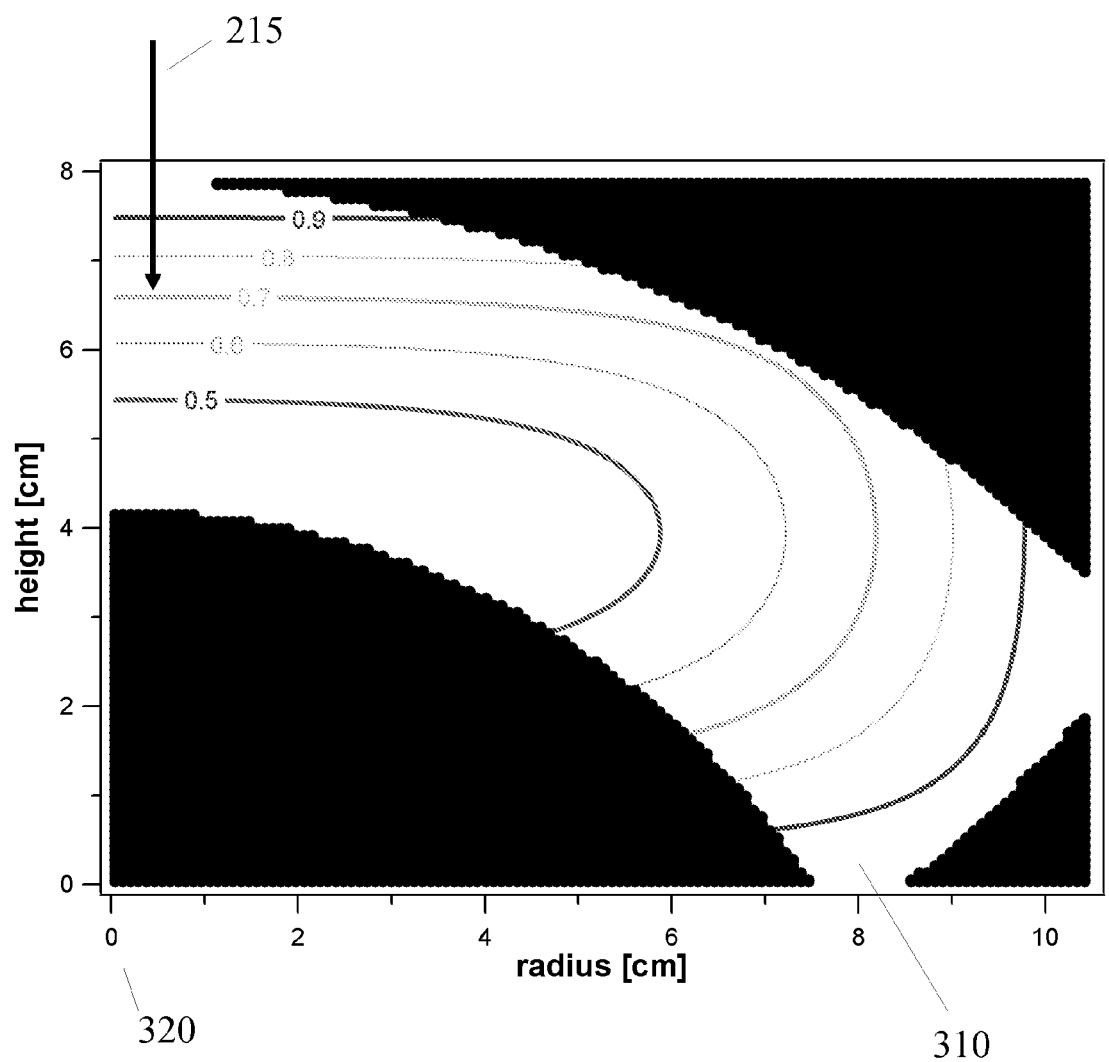

The results of the calculation are plotted for the blank 200 and lens 210 in FIGS. 3a and 3b, respectively. The $H_2$ concentration profiles, depicted as contour lines in FIGS. 3a and 3b, represent different isohydrogen concentrations within the fused silica glass blank 200 and lens 210. The concentration profiles are plotted as a function of radius r, where r=0 is the centerline 320 of blank 300 and lens 310. The calculations are based upon loading the blank 300 (FIG. 3a) with hydrogen by heating the blank for 112 days at 475° C. under a constant pressure of 0.24 atm hydrogen. The hydrogen concentration $n(H_2)$ within the loaded blank 300 is in a range from about $0.4 \times 10^{17}$ molecules/$cm^3$ up to about $1 \times 10^{17}$ molecules/$cm^3$. The lens 310 (FIG. 3b) machined from the loaded blank 300 retains the radial concentration profile of the loaded blank 300, and the hydrogen concentration profiles in the lens are asymmetric along the use direction 215.

The present invention provides a method of making a fused silica article. In one embodiment, the fused silica article is an optical element of a photolithography system, such as those used in the semiconductor industry. According to the method, a near net shape of the fused silica part is first provided. Near net shape fused silica parts may have been ground, polished, milled, or otherwise formed by methods known in the art from a fused silica boule—or a blank cut from such a boule—that has either been cast or otherwise consolidated and shaped by methods known in the art.

In one embodiment, the near net shape is formed by first forming a silica soot blank. Methods of forming silica soot blanks are well known in the art and include, but are not limited to vapor deposition techniques such as outside vapor deposition (OVD), inside vapor deposition (IVD), vapor axial deposition (VAD), planar soot deposition (PSD), combinations thereof, or the like. These techniques typically involve passing a gas stream comprising a silicon-containing precursor compound through a flame generated by a combustion burner to form amorphous particles of silica soot, which are then deposited onto a support or substrate to form the silica soot blank. Candidate silicon-containing precursor compounds include, but are not limited to: halogen-containing compounds such as $SiCl_4$, $SiBr_4$, $SiF_4$, and the like; and halide-free cyclosiloxane compounds such as, for example, polymethylsiloxanes. Such polymethylsiloxanes include, but are not limited to, hexamethyldisiloxane, polymethylcyclosiloxane, octamethylcyclotetrasiloxane (OMCTS), decamethylcyclopentasiloxane, hexamethylcyclotrisiloxane, and combinations thereof.

Alternatively, sol-gel methods may be used to provide a porous preform of silica particles. A solution of at least one silicon-containing organic compound is first prepared. The silicon-containing compound has as a general formula of either $Si(OR)_4$ or $Si(OR)_3$, where R is an alkyl group. Non-limiting examples of suitable alkyl groups include: tetraethylorthosilicate ($Si(OC_2H_5)_4$ (also referred to herein as "TEOS"); tetramethylorthosilicate ($Si(OCH_3)_4$; methyltrimethoxysilane ($SiCH_3(OCH_3)_3$; and the like. In one embodiment, the solution is an aqueous solution comprising an acid, such as hydrochloric acid, formic acid, nitric acid, or the like, to act as a gelation catalyst. Organic solvents, such as ethanol or the like, may be added to improve miscibility.

The solution containing the silicon-containing organic compound is then gelled, which results in polymerization of the silicon and production of an alcohol, such as—in the case of TEOS—ethanol. Gelation times may be reduced by heating the solution or by neutralizing the solution pH by adding a second, basic solution. Once gelation is complete, the gel is dried to remove residual water and alcohol (and thus carbon), and to fragment the gel into granules having a mean particle size of less than about 1 mm.

The soot blank or porous preform is then consolidated or sintered to form a fused silica boule from which the near net shape is ultimately machined. Consolidation is usually carried out in an inert atmosphere by heating the boule at a temperature of up to about 1500° C. Prior to consolidation, excess water and hydroxyl (OH) groups may be optionally removed from the soot blank by means of a drying step. In the drying step, the blank is heated in the presence of a drying agent such as a halogen, a halogen-containing compound, carbon monoxide, or other such drying agents known in the art. The drying step is sometimes followed by an oxidation step in which the blank is heated in the presence of oxygen.

The fused silica boule may additionally be reformed or reshaped using methods that are known in the art, such as rolling, squashing, tilt flow, combinations thereof, and the like. A blank may then be cut from the reshaped or reworked fused silica boule and later shaped by means known in the art, including cutting, grinding, polishing, and the like to form the near net shape.

The near net shape is then loaded with molecular hydrogen to a desired concentration. The hydrogen concentration is in a range from about $0.1 \times 10^{17}$ molecules/$cm^3$ up to about $1 \times 10^{19}$ molecules/$cm^3$. In one embodiment, the variation of hydrogen concentration in use direction 215 is less than about $0.5 \times 10^{17}$ molecules/$cm^3$ over an area of at least 25 $cm^2$ of the near net shape.

Figure 4:
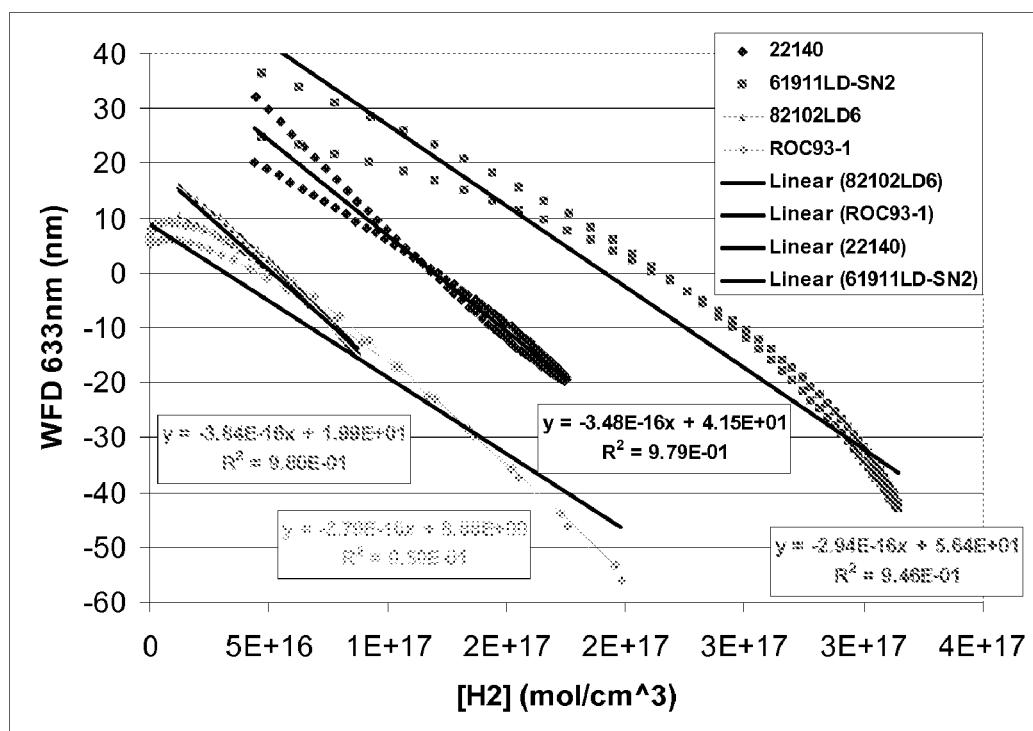
FIG. 4 is a plot of refractive index as a function of hydrogen concentration.

The refractive index—and thus optical quality—of a fused silica optical element is particularly sensitive to the presence and distribution of hydrogen within the fused silica part. FIG. 4, which is a plot of the index of refraction for different rectangular (100 mm×40 mm×60 mm) fused silica samples as a function of hydrogen concentration, shows the impact of hydrogen concentration on refractive index. The data plotted in FIG. 4 show that the refractive index decreases by about 0.33 ppm/cm per $1 \times 10^{17}$ molecules/$cm^3$ of hydrogen. In one embodiment, the near net shape has an index homogeneity of less than about 5 ppm and, in one embodiment, less 2 ppm, over an area of at least about 25 $cm^2$.

Hydrogen loading is accomplished by diffusing hydrogen into the near net shape part. The diffusion step is typically carried out by heating the near net shape in an atmosphere comprising hydrogen and an inert gas such as, but not limited to, nitrogen, helium, argon, and the like. The diffusion step is carried out at a predetermined temperature for the time needed to achieve the desired $H_2$ concentration in the part. In one embodiment, the predetermined temperature is in a range from about 350° C. up to about 700° C. and, in one particular embodiment, the predetermined temperature is in a range from about 400° C. up to about 500° C. Under these conditions, the time needed to load the part may be 3600 hours or longer, depending on the geometry and size of the piece. In one embodiment, the diffusion step comprises heating the near net shape at a temperature in a range from about 400° C. up to about 500° C. in an atmosphere comprising nitrogen and from 1% up to about 100% hydrogen. In one particular embodiment, the diffusion step comprises heating the near net shape at a temperature in a range from about 400° C. up to about 500° C. in an atmosphere comprising nitrogen and about 24% hydrogen.

The diffusion step typically includes exposing the near net shape part to an atmosphere comprising from about 1% up to about 100% hydrogen. In those instances where the atmosphere does not consist solely of hydrogen, the atmosphere also comprises an inert gas such as nitrogen, helium, argon, or the like. In one embodiment, the atmosphere is approximately equal to or near ambient pressure (1 atm or 1.01 bar). Hydrogen is allowed to diffuse into the near net shape part to the point where the desired $H_2$ concentration is achieved in the part. In one embodiment, a substantially uniform distribution of the hydrogen species is achieved throughout the near net shape part. Under these conditions, the diffusion step may be carried out over a period of several weeks or months in order to obtain an acceptable level of homogeneity of hydrogen in the near net shape.

Figure 5:
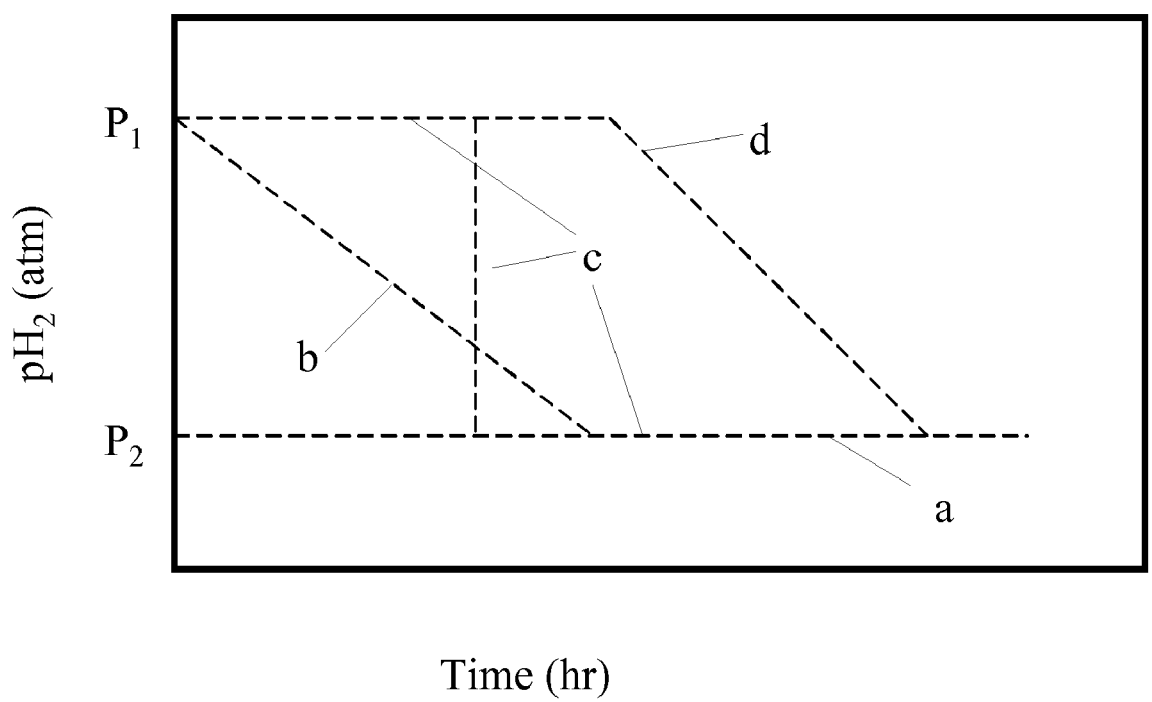
FIG. 5 is a plot of examples of time-pressure schedules for hydrogen loading.

The near net shape part may be loaded with hydrogen using one of several predetermined pressure-time loading schedules. Examples of time-pressure schemes are schematically shown in FIG. 5. In one embodiment, the near net shape is loaded by maintaining the hydrogen pressure at a constant pressure $P_2$ ((a) in FIG. 5), where the constant pressure is sufficient to produce the desired $H_2$ concentration of about $1 \times 10^{17}$ molecules/cm$^3$ at the surface of the near net shape. Alternatively, the $H_2$ pressure may be varied. Three variable pressure loading schedules are shown in FIG. 5: a linear decrease from pressure $P_1$ to pressure $P_2$ with no hold at $P_1$ ((b) in FIG. 5); a hold at pressure $P_1$ with a sudden decrease in pressure from $P_1$ to $P_2$, followed by a hold at $P_2$ ((c) in FIG. 5); and a hold at pressure $P_1$ followed by a linear decrease in pressure to $P_2$ and a hold at $P_2$ ((d) in FIG. 5). The possible hydrogen loading schedules are not limited to the examples shown in FIG. 5. Other hydrogen loading schedules incorporating additional holds at pressures, holds at intermediate pressures, and the like are also possible.

Figure 6:
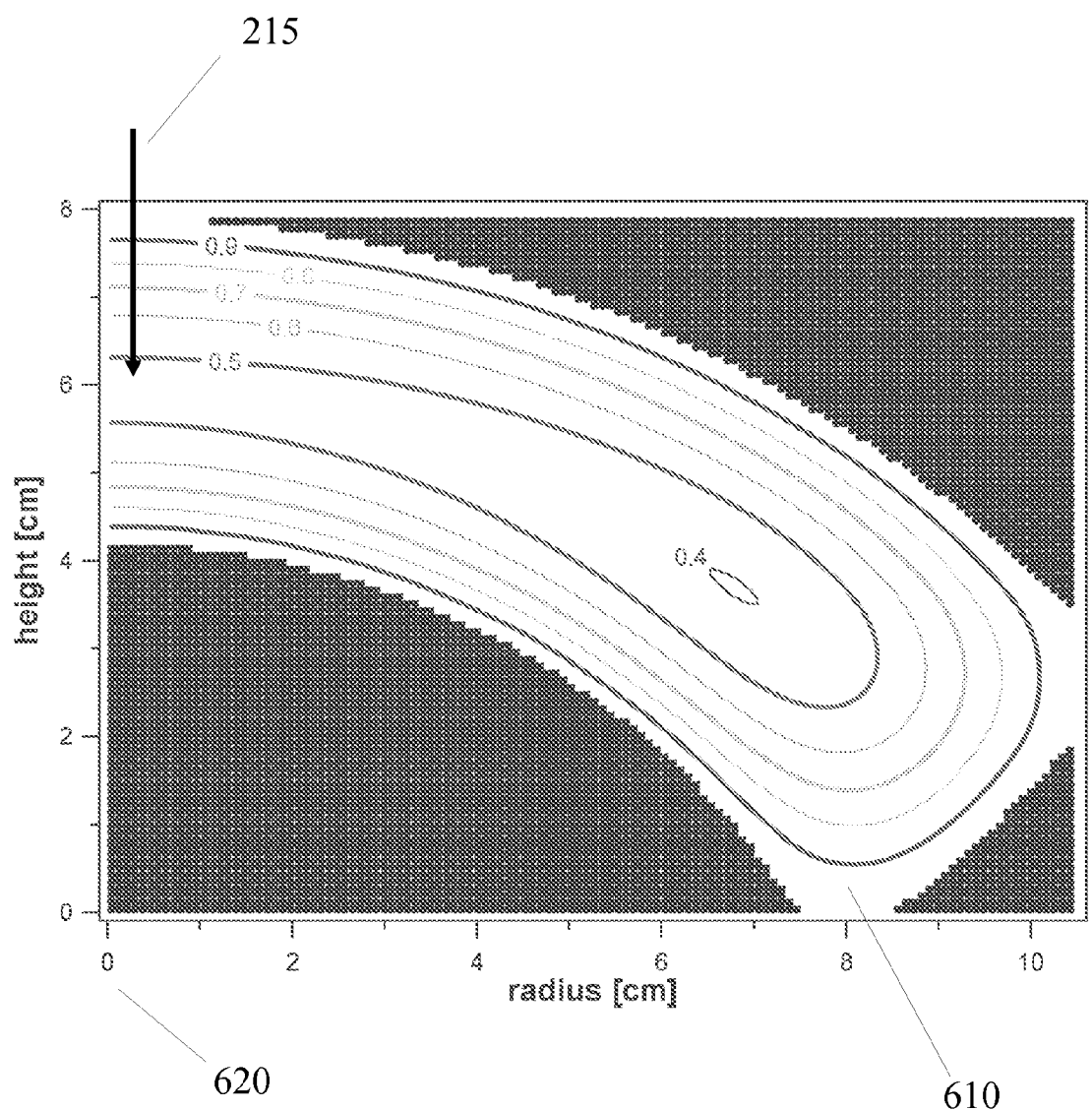
FIG. 6 is a plot of hydrogen concentration profiles calculated for a near net shape meniscus lens loaded using a constant pressure loading schedule.

Hydrogen concentration profiles calculated for a near net shape lens loaded using a constant pressure loading schedule are shown in FIG. 6. The hydrogen concentration profiles were calculated using the hydrogen diffusion-reaction model. The calculations are based upon loading the near net shape lens 610 with hydrogen by heating the near net shape for 29 days at 475° C. under a constant pressure of 0.24 atm hydrogen. Hydrogen concentration profiles are plotted as a function of radius r, where r=0 is the centerline 620 of the near net shape lens 610. The hydrogen concentration profiles, depicted as contour lines in FIG. 6, represent different isohydrogen concentrations within the near net shape. Based on the hydrogen diffusion-reaction model, hydrogen loading of the near net shape lens 610 under a constant hydrogen pressure requires only 26% of the time required (112 days) to load a right cylindrical fused silica blank having a minimum thickness and diameter to contain the lens under similar conditions (see FIGS. 3*a*, 3*b*).

As seen in FIG. 6, the isohydrogen contours in the loaded near net shape lens 610 are symmetric along use direction 215, decreasing from a maximum value of about $0.9 \times 10^{17}$ molecules/cm$^3$ at the exterior surfaces to a minimum of about $0.5 \times 10^{17}$ molecules/cm$^3$ at the approximate center of the lens. In contrast to the loaded near net shape lens 610, the isohydrogen contours in the lens 310 cut from a hydrogen loaded blank 300 (FIG. 3*b*) are asymmetric, decreasing in value along the use direction 215 from a maximum value of about $0.9 \times 10^{17}$ molecules/cm$^3$ at a first exterior surface to a minimum of about $0.5 \times 10^{17}$ molecules/cm$^3$ at the opposite exterior surface along the use direction 215. By loading the near net shape lens 610 instead of a blank with hydrogen, not only is less time needed to achieve the desired hydrogen concentration, but a more even hydrogen distribution and higher hydrogen concentration are obtained in the lens. The distribution of the isohydrogen contours in the loaded near net shape lens 610 differs from that of the lens 310 cut from a loaded blank 300 as well. At the center line (r=0) of the loaded near net shape lens (FIG. 6), the region having a concentration of less than about $0.5 \times 10^{17}$ molecules/cm$^3$ has a width of about 7 mm, or about 22% of the thickness of the lens at the center line 320. In contrast to the near net shape, the region having a concentration of less than about $0.5 \times 10^{17}$ molecules/cm$^3$ in the lens 310 cut from a loaded blank 300 (FIG. 3*b*) has a width of about 16 mm, or about 50% of the thickness of the lens at the center line 320.

In one particular embodiment, the loading schedule comprises two steps. In the first step, the near net shape is heated at a temperature of about 475° C. in an atmosphere comprising 90-100% hydrogen. In the second step, the hydrogen concentration is reduced to a level to yield a concentration of about $1 \times 10^{17}$ molecules/cm$^3$ at the surface of the near net shape. The solubility of hydrogen in silica is a function of temperature. Thus, the hydrogen concentration used in the second step depends upon the temperature at which loading is carried out. At 475° C., for example, the hydrogen concentration needed to achieve the desired loading is about 24%.

Figure 7:
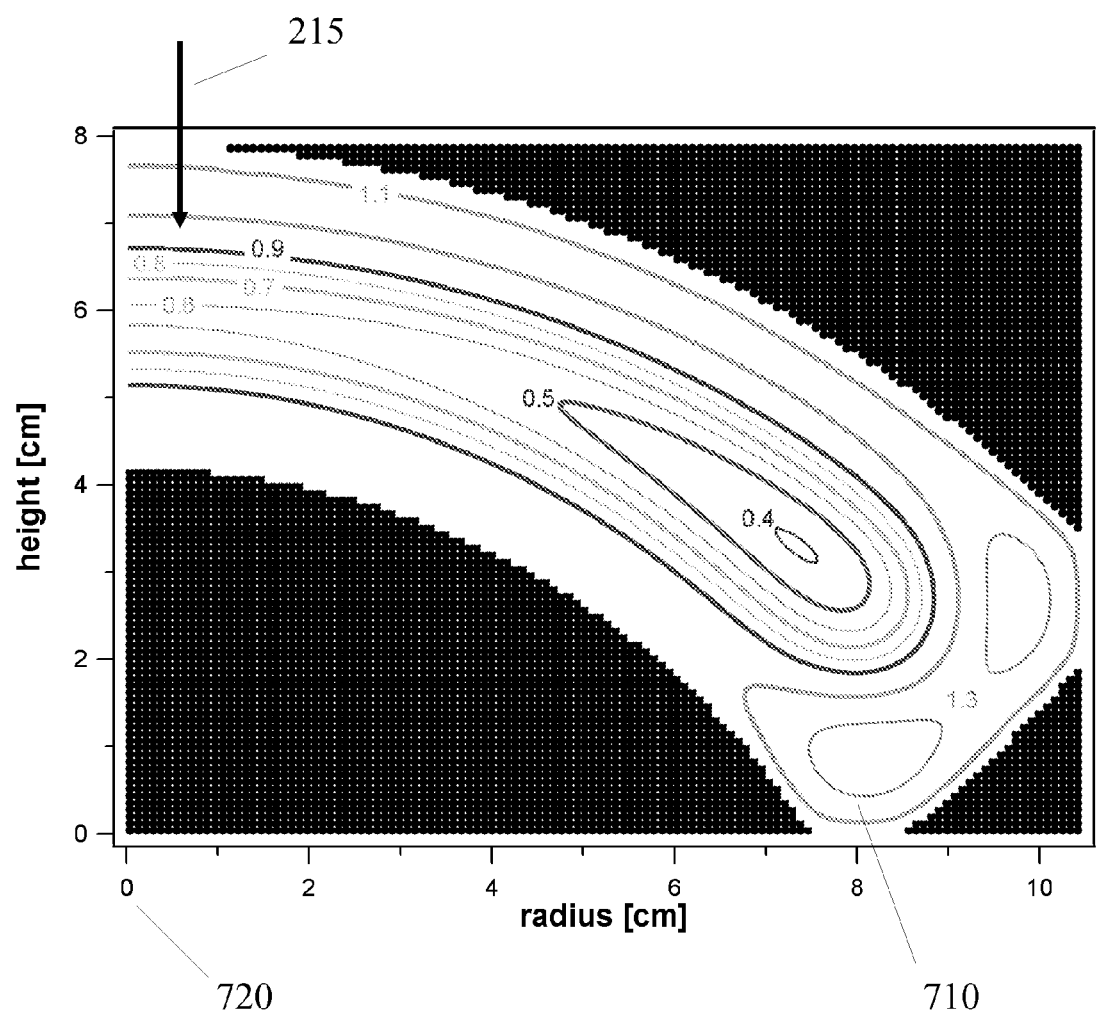
FIG. 7 is a plot of hydrogen concentration profiles calculated for a near net shape meniscus lens loaded with hydrogen using a variable pressure loading schedule.

Hydrogen concentration profiles calculated for a near net shape meniscus lens loaded with hydrogen using a variable pressure loading schedule are plotted in FIG. 7. The hydrogen concentration profiles were calculated using the hydrogen reaction diffusion model. The hydrogen concentration profiles, depicted as contour lines in FIG. 7, represent different isohydrogen concentrations within the near net shape lens 710. The calculations are based upon loading the near net shape lens 710 with hydrogen by heating the near net shape for seven days at 475° C. under a constant pressure of 0.98 atm hydrogen, followed by heating for six days at 475° C. under a hydrogen pressure of about 0.24 atm.

Figure 8A:
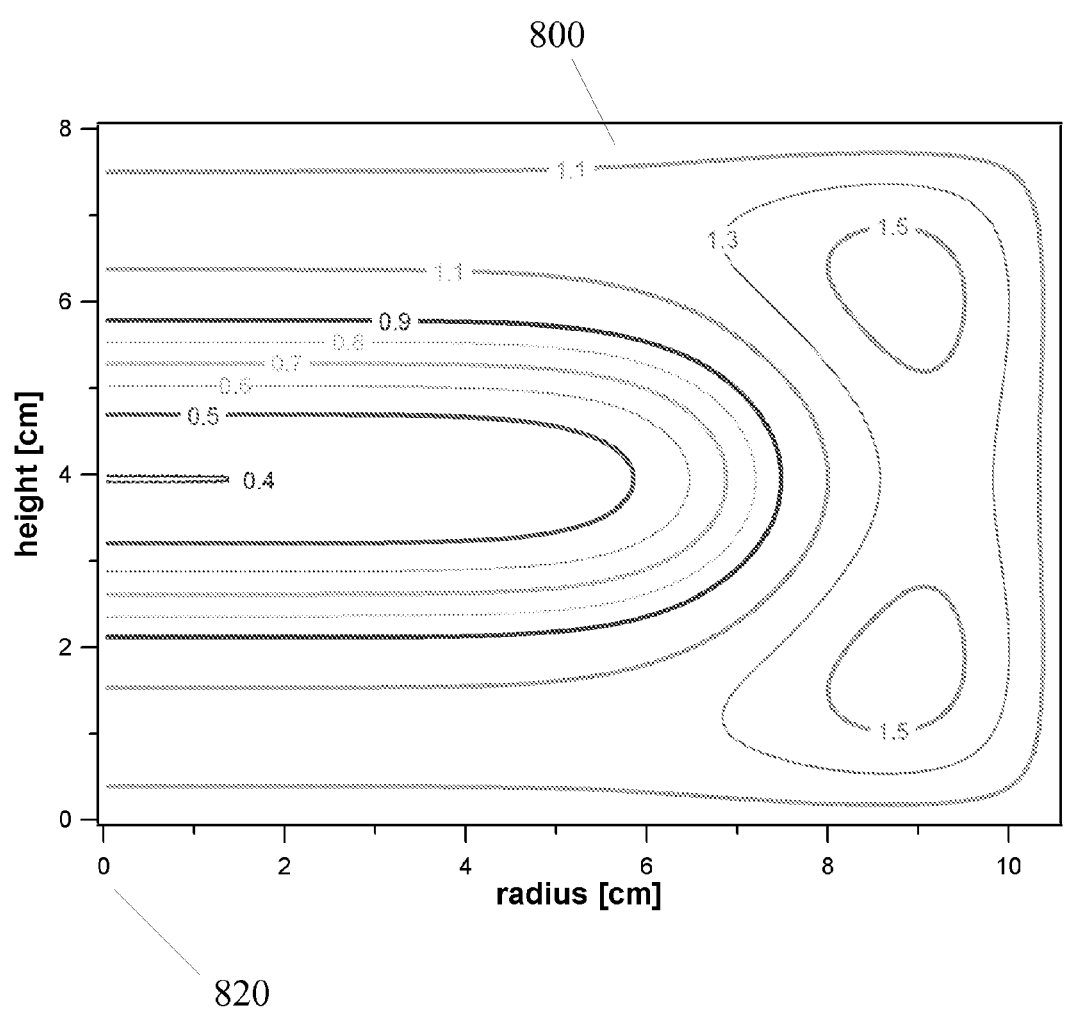
FIG. 8a is a plot of hydrogen concentration profiles calculated for a blank loaded with hydrogen using a variable pressure loading schedule.

For comparison, hydrogen diffusion-reaction modeling calculations were carried out for a fused silica blank loaded with hydrogen and a meniscus lens cut from the loaded blank, using a variable loading schedule similar to that considered in the calculations shown in FIG. 7. The calculations are based upon loading the fused silica blank with hydrogen by heating the blank for 28 days at 475° C. under a constant pressure of 0.98 atm hydrogen, followed by heating for 20 days at 475° C. under hydrogen pressure of about 0.24 atm. The loading time using the variable loading schedule is about 43% of that needed to load the fused silica blank under constant pressure, shown in FIGS. 3*a* and 3*b*. Hydrogen concentration profiles for the loaded blank 800 and the meniscus lens 810 cut from the loaded blank 800 are plotted functions of radius in FIGS. 8*a* and 8*b*, respectively, where r=0 is the centerline 820 of both the blank and near net shape lens. As seen from FIG. 8*b*, the lens 810 (FIG. 9*b*) machined from the loaded blank 800 retains the radial concentration profile of the loaded blank 800, and the hydrogen concentration profiles in the lens 810 are asymmetric along the use direction 215. The time needed for hydrogen loading of the near net shape lens 710 under the variable pressure schedule is about 27% of the time needed to load the fused silica blank 800 using a similar variable hydrogen pressure loading schedule.

As seen in FIG. 7, the isohydrogen contours in the near net shape lens 710 loaded with hydrogen using the variable pressure schedule decrease from a maximum value of about $1.1 \times 10^{17}$ molecules/cm$^3$ at the exterior surfaces to a minimum of about $0.6 \times 10^{17}$ molecules/cm$^3$ at the approximate center of the lens. In contrast to the loaded near net shape lens 710, the isohydrogen contours in the lens 810 (FIG. 8*b*) cut from a blank 800 that was loaded with hydrogen under conditions similar to those used to load near net shape lens 710 decrease in value along the use direction 215 from a maximum value of $1.1 \times 10^{17}$ molecules/cm$^3$ at a first exterior surface to a minimum of $0.5 \times 10^{17}$ molecules/cm$^3$ at the opposite exterior surface. By loading the near net shape lens 710 with hydrogen instead of loading a blank, a more even distribution and higher hydrogen concentration are obtained in the loaded lens. The distribution of the isohydrogen contours in the loaded near net shape lens 710 differs from that of the lens 810 cut from a loaded blank 800 as well. At the center line 720 (r=0) of the loaded near net shape lens 710 in FIG. 7, the region having a concentration of less than $0.6 \times 10^{17}$ molecules/cm$^3$ has a width of about 2 mm, or about 6% of the thickness of the lens at the center line 720, and the region having a concentration of greater than $0.9 \times 10^{17}$ molecules/cm$^3$ has a width of about 19 mm, or about 59% of the thickness of the lens at the center line 720. In the lens 810 cut from a blank 800 (FIG. 8b) loaded under the same conditions, the region having a concentration of less than $0.6 \times 10^{17}$ molecules/cm$^3$ has a width of about 7 mm, or about 22% of the thickness of the lens 810 at the center line 820, and the region having a concentration of greater than $0.9 \times 10^{17}$ molecules/cm$^3$ has a width of about 19 mm, or about 59% of the thickness of the lens at the center line 820.

Figure 9:
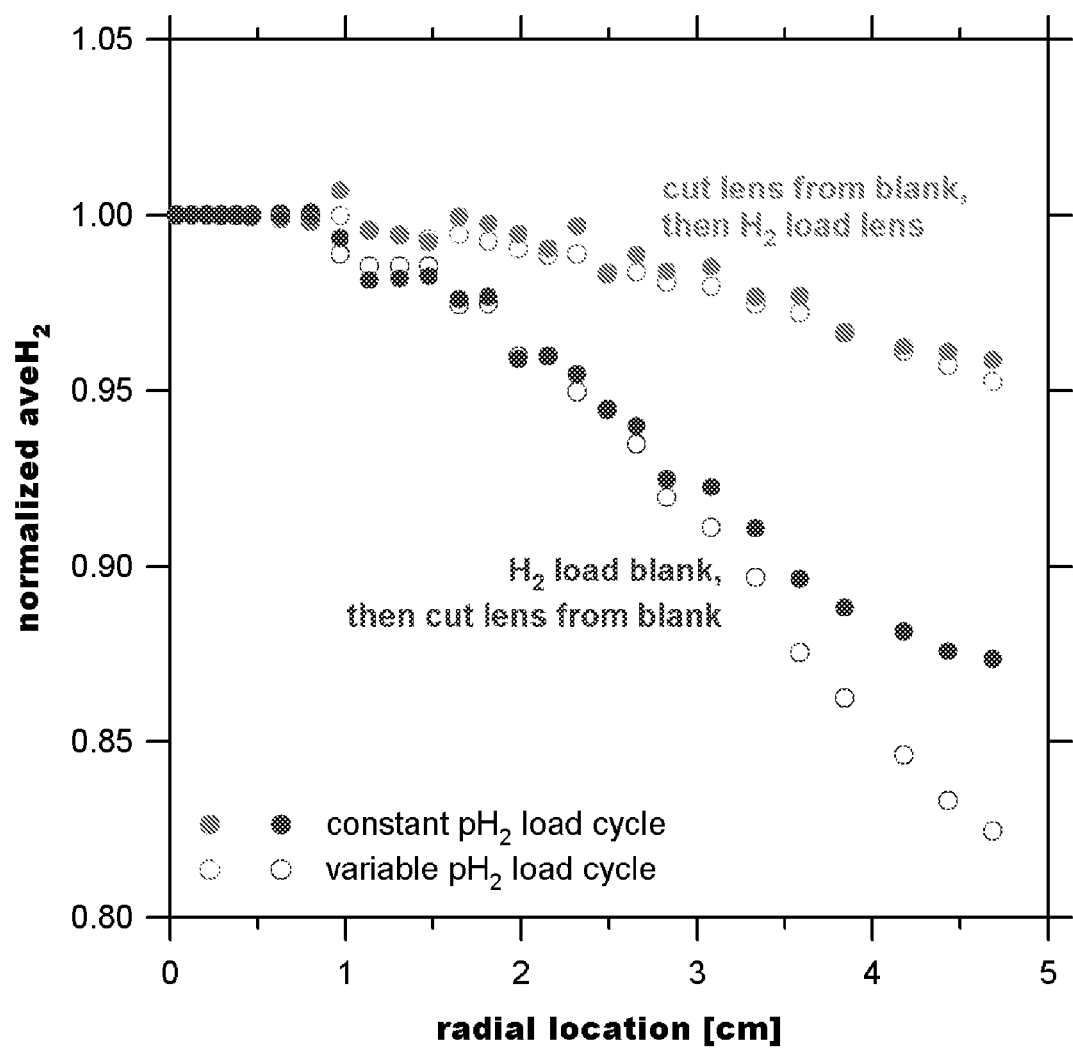
FIG. 9 is a plot of average hydrogen concentrations calculated for meniscus lenses cut from hydrogen loaded blanks and hydrogen loaded near net shape lenses as a function of radial location.

The normalized average hydrogen concentration determined from the hydrogen diffusion-reaction model in the use direction 215 of meniscus lens 210 is plotted as a function of radial (r=0) at the centerline of the lens) location in FIG. 9. FIG. 9 includes data calculated for lenses cut from hydrogen loaded blanks and hydrogen loaded near net shape lenses. The normalized average hydrogen concentration for lenses cut from blanks decreases from 1.0 at the center line (r=0) to about 0.87 and 0.82 at r=4.5 cm for blanks loaded at constant pressure and blanks loaded under variable pressure schedule, respectively, with the lenses loaded under both pressure schedules exhibiting the approximately the same average H$_2$ concentration from the centerline out to r=3 cm. In contrast to the lenses cut from H$_2$ loaded blanks, the normalized average H$_2$ concentration in loaded near net shape lenses decreases from 1.0 at the center line to about 0.095 at r=4.5 cm, with no significant difference in H$_2$ concentration between near net shape lenses loaded at constant pressure and near net shape lenses loaded under variable pressure schedule.

As previously described herein, the refractive index—and thus optical quality—of a fused silica optical element is particularly sensitive to the presence and distribution of hydrogen within the fused silica part. By providing a near net shape part with a hydrogen profile that is symmetric and more evenly distributed along the use direction of the part, a greater degree of index homogeneity in the use direction 215 or, in one embodiment, the radial direction of the part, may be achieved. This in turn may reduce laser induced damage and effects, such as, for example, wavefront distortion, within the part.

In another embodiment, the diffusion step includes initially exposing the near net shape part at the predetermined temperature to a first hydrogen pressure that is greater than atmospheric pressure, and is in a range from about 1 atm up to about 300 atm and, in another embodiment, from about 1 atm up to about 34 atm. The greater than atmospheric pressure loads the outer regions of the fused silica with hydrogen. This method of loading creates a hydrogen concentration gradient across the body of the fused silica near net shape part, with the exterior or peripheral regions of the near net shape part having a higher concentration of hydrogen species than the central or interior portion of the near net shape part. Following exposure to such pressures, the hydrogen pressure is decreased to a value that is sufficient to achieve a desired hydrogen concentration in a range from about $0.1 \times 10^{17}$ molecules/cm$^3$ up to about $1 \times 10^{19}$ molecules/cm$^3$ within the part. Continued heating at the predetermined temperature and reduction of H$_2$ pressure allow the hydrogen to migrate to those regions of lower concentration until the concentration of hydrogen throughout the near net shape part is either substantially homogenous or within the desired concentration limits.

In another embodiment, the hydrogen pressure of the species is varied or "cycled"—i.e., the hydrogen pressure is maintained at a first pressure having higher than ambient value for a first duration time and then reduced to a second hydrogen pressure that is less than ambient pressure, which is maintained for a second duration time. In one embodiment, both the first duration time and the second duration time are in a range from about 5 minutes up to about 60 days, with actual duration times depending on the size and geometry of the near net shape part. The near net shape part is typically held at a predetermined temperature while the pressure is pulsed at the first pressure and then reduced to the second pressure. The hydrogen pressure may be cycled or varied regularly, repeatedly exposing the near net shape to the same hydrogen pressures and temperatures for each cycle. Likewise, the duration times for each part of the cycle are the same. In another embodiment, the hydrogen pressures, temperatures, and duration times may be varied.

In one embodiment, the hydrogen pressure may be varied or cycled multiple times to achieve the desired concentration of hydrogen within—and throughout—the near net shape. The number of cycles and total time depend on the size of the part to be loaded, with times ranging up to about 1000 hours. In one embodiment, the hydrogen concentration within the fused silica article is in a range from about $0.1 \times 10^{17}$ molecules/cm$^3$ up to about $1 \times 10^{19}$ molecules/cm$^3$. Once the desired loading is achieved, the hydrogen pressure is reduced. Hydrogen migrates from the loaded region of the near net shape to those regions of the near net shape having lower hydrogen concentrations, thus providing a substantially homogeneous hydrogen loading throughout the near net shape.

In one embodiment, deuterium is present an amount that is less than or equal to its natural isotopic abundance (i.e.; $n(D)/(n(H)+n(D)) \leq 2 \times 10^4$, where $n(H)$ and $n(D)$ denote the number or concentration of protium (H) atoms and deuterium (D) atoms, respectively). In another embodiment, deuterium is present in an amount that is greater than its natural isotopic abundance (i.e.; $n(D)/(n(H)+n(D)) > 2 \times 10^{-4}$).

A method of loading a fused silica near net shape part with hydrogen is also provided. A near net shape part is first provided, as previously described hereinabove. The near net shape part is then exposed to a first hydrogen pressure for a predetermined time period at a predetermined temperature. Following the exposure to the first hydrogen pressure for the first predetermined time period, the hydrogen pressure is reduced to a second hydrogen pressure and maintained at that pressure for a second time period. The second time period is sufficient to load the near net shape with a hydrogen concentration in a range from about $0.1 \times 10^{17}$ molecules/cm$^3$ up to about $1 \times 10^{19}$ molecules/cm$^3$.

Using the methods described herein, the time required to load a fused silica article with hydrogen is less than that needed to achieve the same H$_2$ concentration in the article using hydrogen loading methods currently in use. Because the near net shape is formed to shape before loading, it is thinner than the fused silica piece from which it is prepared and can therefore be loaded more quickly. Moreover, the methods of the present invention are compatible with other techniques such as, for example, use of steep H$_2$ gradients and variable pressure loading. The index homogeneity in the final part may also be improved over that of previous methods, depending on the shape of the final part.

A fused silica article formed and loaded with hydrogen using the methods described herein is also provided. The fused silica article has a hydrogen concentration in a range from about $0.1\times10^{17}$ molecules/cm$^3$ up to about $1\times10^{17}$ molecules/cm$^3$. In one embodiment, the fused silica article has an index homogeneity of less than about 5 ppm and, in one embodiment, less than 2 ppm, over an area of at least 25 cm$^2$.

The following example illustrates the features and advantages of the invention, and is in no way intended to limit the invention thereto. While the example describes the diffusion of hydrogen (i.e., the naturally occurring mixture of protium and deuterium molecules and atoms), it is expected that the model would produce similar results for any other mixtures of the natural isotopes of hydrogen as well.

EXAMPLE 1

A fused silica near net meniscus shape lens, similar to that shown in FIG. 2, was loaded with hydrogen according to the schedule shown in Table 1. The lens was heated in a furnace from room temperature (25° C.) up to 475° C. under 1.055 atm hydrogen and was held at that temperature and hydrogen pressure for 136 hours. The hydrogen pressure was then reduced to 0.232 atm over 0.5 hr, and the near net shape lens was held at 475° C. under 0.232 atm H$_2$ for 136 hours before being cooled to room temperature.

TABLE 1

| Time (hr) | Temperature (° C.) | H$_2$ Pressure (atm) |
|---|---|---|
| 0 | 25 | 1.055 |
| 1.5 | 475 | 1.055 |
| 137.5 | 475 | 1.055 |
| 138 | 475 | 0.232 |
| 274 | 475 | 0.232 |
| 275 | 25 | 0.232 |

Following loading, the hydrogen concentration within the near net shape lens, expressed in $10^{17}$ molecules/cm$^3$, was determined as a function of location using Raman spectroscopy. The results of the Raman spectroscopy measurements, obtained at various distances from the inner diameter of the near net shape lens along four different axes within the fused silica lens, are listed in Table 2.

TABLE 2

| | H$_2$ concentration × $10^{17}$ molecules/cm$^3$ | | | |
|---|---|---|---|---|
| Depth (mm) | Axis 2B | Axis 4B | Axis 7B | Axis 8B |
| 4 | 1.04 | 0.931 | 0.950 | 0.871 |
| 8 | 0.787 | 0.757 | 0.664 | 0.705 |
| 12 | 0.752 | 0.558 | 0.521 | 0.508 |
| 16 | 0.514 | 0.465 | 0.408 | 0.306 |
| 20 | 0.418 | 0.408 | 0.361 | 0.278 |
| 24 | 0.443 | 0.533 | 0.455 | 0.348 |
| 28 | 0.758 | 0.709 | 0.510 | 0.489 |
| 32 | 0.776 | 0.864 | 0.726 | 0.731 |
| 36 | 0.767 | 0.773 | 0.915 | 0.858 |

Figure 10:
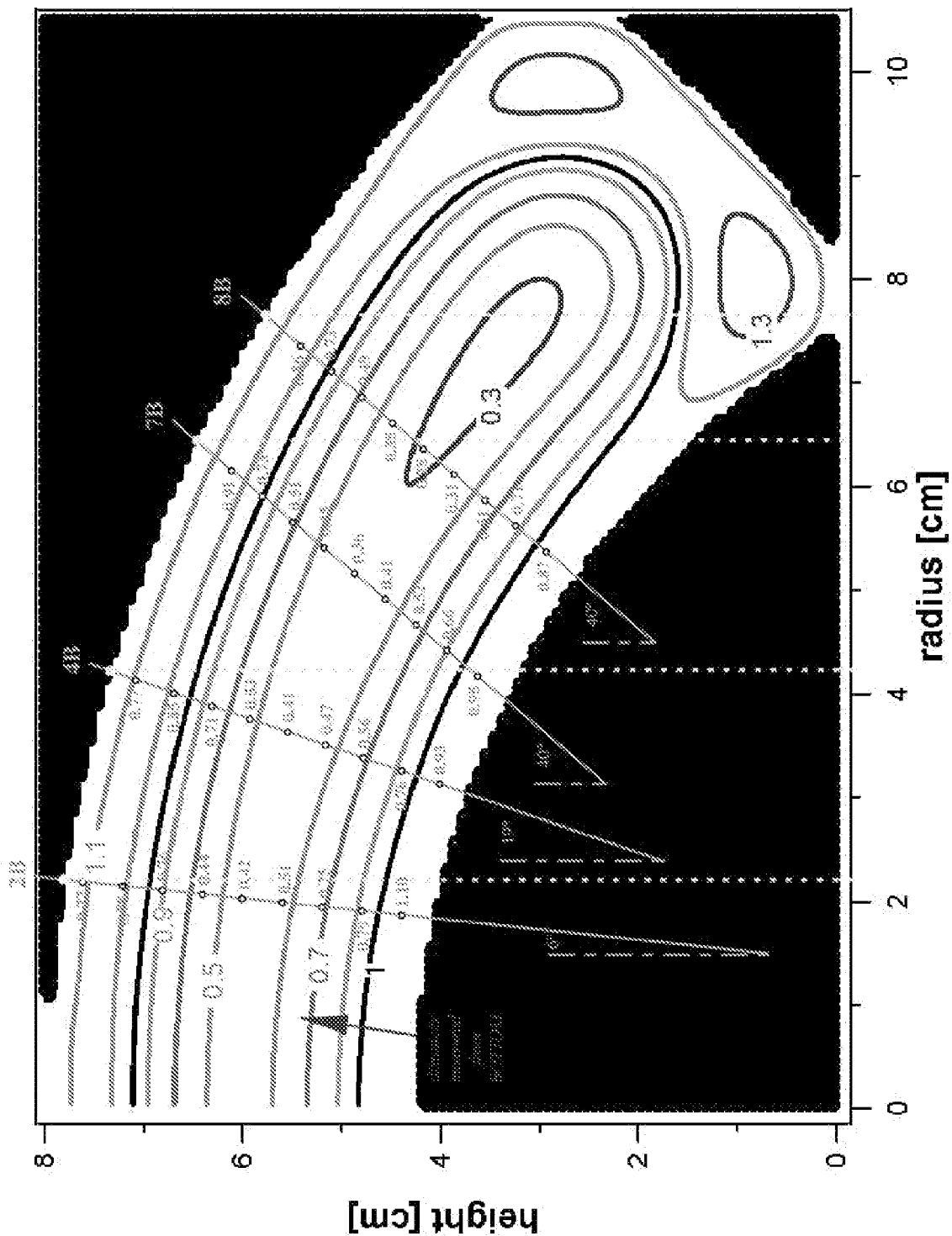
FIG. 10 is a plot of hydrogen concentrations calculated from a hydrogen reaction and diffusion model and hydrogen concentrations determined from Raman spectroscopy measurements in a portion of a near net shape lens.

The hydrogen diffusion-reaction model previously described herein was also used to calculate the hydrogen distribution within the near net shape lens. The hydrogen concentrations calculated from the model and determined from the Raman spectroscopy measurements are plotted on a portion of near net shape lens in FIG. 10. The H$_2$ concentrations calculated by the model are plotted as contours, whereas the results of the Raman measurements are plotted as discrete points.

Raman measurements are affected by accuracy, uncertainties in location, and control of loading parameters, such as furnace temperature and hydrogen concentration within the furnace. Nonetheless, the results of the Raman measurements agree reasonably well with the modeling results.

Whereas hydrogen loading of meniscus lenses has been described herein, it will be understood and appreciated by those skilled in the art that the invention described herein encompasses hydrogen loading of other fused silica near net shapes such as, but not limited to, concave lenses, convex lenses, combinations thereof, and the like. The hydrogen concentration profiles within these near net shape parts and the time need to load the near net shape part with hydrogen will depend upon the size and geometry of the particular part. Nonetheless, the time needed to load the near net shapes with hydrogen using the methods described herein should be significantly less than that need to load a fused silica blank from which the part is machined.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

The invention claimed is:

1. A fused silica article, the fused silica article having a hydrogen concentration in a range from about $0.1\times10^{17}$ molecules/cm$^3$ up to about $1\times10^{19}$ molecules/cm$^3$ and an index homogeneity of less than about 5 ppm over an area of at least about 25 cm$^2$, wherein hydrogen has been loaded into a near net shape of the fused silica article, wherein the fused silica article is one of a concave optical element, a convex optical element, and a meniscus optical element having a concave surface and a convex surface, and wherein isohydrogen contours in the fused silica article are symmetric along a use direction and the hydrogen concentration decreases from a first external surface and a second external surface opposite the first external surface along the use direction toward an interior point in the fused silica article.

2. The fused silica article according to claim 1, wherein the index homogeneity is less than 2 ppm over an area of at least about 25 cm$^2$.

3. The fused silica article according to claim 2, wherein the hydrogen concentration varies by less than about $0.5\times10^{17}$ molecules/cm$^3$ over an area of at least about 25 cm$^2$.

4. The fused silica article according to claim 1, wherein the fused silica article is formed by:
   a. providing a near net shape of the fused silica article;
   b. loading the near net shape with a hydrogen concentration in a range from about $0.1\times10^{17}$ molecules/cm$^3$ up to about $1\times10^{19}$ molecules/cm$^3$; and
   c. finishing the near net shape after loading the near net shape with hydrogen to form the fused silica article.

5. A method of making a fused silica article, the method comprising:
   a. providing a near net shape of the fused silica article;
   b. loading the near net shape with a hydrogen concentration in a range from about $0.1\times10^{17}$ molecules/cm$^3$ up to about $1\times10^{19}$ molecules/cm$^3$; and
   c. finishing the near net shape after loading the near net shape with hydrogen to form the fused silica article, wherein the fused silica article is one of a concave optical element, a convex optical element, and a meniscus optical element having a concave surface and a convex surface, and wherein isohydrogen contours in the fused silica article are symmetric along a use direction toward an interior point in the fused silica article and the hydrogen concentration decreases from a first external surface and a second external surface opposite the first external surface along the use direction.

6. The method according to claim 5, wherein the fused silica article has an index homogeneity of less than about 5 ppm over an area of at least about 25 cm$^2$.

7. The method according to claim 6, wherein the index homogeneity is less than 2 ppm over an area of at least about 25 cm$^2$.

8. The method according to claim 6, wherein the hydrogen concentration varies by less than about $0.5 \times 10^{17}$ molecules/cm$^3$ over an area of at least about 25 cm$^2$.

9. The method according to claim 5, wherein the step of providing the near net shape comprises:
   a. providing a silica soot blank;
   b. consolidating the silica soot blank at a predetermined temperature to form a fused silica boule;
   c. machining the fused silica boule to form the near net shape.

10. The method according to claim 9, wherein the step of providing a silica soot blank comprises depositing silica soot on a substrate by one of outside vapor deposition, inside vapor deposition, planar vapor deposition, vapor axial deposition, a sol-gel process, and combinations thereof.

11. The method according to claim 5, wherein the step of loading the near net shape with a hydrogen concentration of in a range from about $0.1 \times 10^{17}$ molecules/cm$^3$ up to about $1 \times 10^{19}$ molecules/cm$^3$ comprises diffusing hydrogen into the near net shape at a predetermined temperature.

12. The method according to claim 11, wherein the step of diffusing hydrogen into the near net shape comprises exposing the near net shape to at least one pressure cycle, the pressure cycle comprising the steps of:
   a. exposing the near net shape to a first hydrogen pressure for a first duration time, and
   b. exposing the near net shape to a second hydrogen pressure for a second duration time, wherein the second pressure is less than the first pressure.

13. The method according to claim 12, wherein at least one of the first hydrogen pressure and the second hydrogen pressure is in a range from about 0.03 atm up to about 300 atm.

14. The method according to claim 5, wherein the predetermined temperature is in a range from about 350° C. up to about 700° C.

15. The method according to claim 14, wherein the predetermined temperature is in a range from about 400° C. up to about 500° C.

16. A method of loading a fused silica near net shape with hydrogen, the method comprising the steps of:
   a. providing the near net shape, wherein the near net shape is a near net shape of one of a concave optical element, a convex optical element, and a meniscus optical element having a concave surface and a convex surface;
   b. exposing the near net shape to a first hydrogen pressure for a first time period, wherein hydrogen diffuses into the near net shape; and
   c. reducing the first hydrogen pressure to a second hydrogen pressure; and
   d. exposing the near net shape to the second hydrogen pressure for a second time period, wherein the second hydrogen pressure is sufficient to load a region of the near net shape with a hydrogen concentration in a range from about $0.1 \times 10^{17}$ molecules/cm$^3$ up to about $1 \times 10^{19}$ molecules/cm$^3$, wherein isohydrogen contours in the fused silica article are symmetric along a use direction of the near net shape and the hydrogen concentration decreases from a first external surface and a second external surface opposite the first external surface along the use direction toward an interior point in the fused silica article.

17. The method according to claim 16, wherein at least one of the first hydrogen pressure and the second hydrogen pressure is in a range from about 0.03 atm up to about 300 atm.

18. The method according to claim 16, further comprising heating the near net shape at a temperature in a range from about 350° C. up to about 700° C. while exposing the near net shape to the first pressure, reducing the first hydrogen pressure to the second hydrogen pressure, and exposing the near net shape to the second hydrogen pressure.

19. The method according to claim 16, wherein the temperature is in a range from about 400° C. up to about 500° C.

20. A method of making a fused silica article, the method comprising:
   a. providing a near net shape of the fused silica article, wherein the fused silica article is one of a concave optical element, a convex optical element, and a meniscus optical element having a concave surface and a convex surface;
   b. exposing the near net shape to a first hydrogen pressure for a first time period, wherein hydrogen diffuses into the near net shape; and
   c. reducing the first hydrogen pressure to a second hydrogen pressure;
   d. exposing the near net shape to the second hydrogen pressure for a second time period;
   e. finishing the near net shape to form the fused silica article, wherein the first and second time periods are sufficient to provide a region of the fused silica article with a hydrogen concentration of in a range from about $0.1 \times 10^{17}$ molecules/cm$^3$ up to about $1 \times 10^{19}$ molecules/cm$^3$, wherein the fused silica article has an index homogeneity of less than about 5 ppm over an area of at least about 25 cm$^2$, and wherein isohydrogen contours in the fused silica article are symmetric along a use direction and the hydrogen concentration decreases from a first external surface and a second external surface opposite the first external surface along the use direction toward an interior point in the fused silica article.

21. The method according to claim 20, wherein at least one of the first hydrogen pressure and second hydrogen pressure is in a range from about 0.03 atm up to about 300 atm.

22. The method according to claim 20, wherein the step of providing the near net shape comprises:
   a. providing a silica soot blank;
   b. consolidating the silica soot blank at a predetermined temperature to form a fused silica boule; and
   c. machining the fused silica boule to form the near net shape.

23. The method according to claim 20, wherein the step of providing a silica soot blank comprises depositing silica soot on a substrate by one of outside vapor deposition, inside vapor deposition, planar vapor deposition, vapor axial deposition, a sol-gel process, and combinations thereof.

24. The method of claim 20, wherein the step of exposing the near net shape to a first hydrogen pressure for a first time period comprises exposing the near net shape to a first hydrogen pressure for a first time period at a temperature in a range from about 350° C. up to about 700° C.

25. The method according to claim 20, wherein the hydrogen concentration varies by less than about $0.5 \times 10^{17}$ molecules/cm$^3$ over an area of at least about 25 cm$^2$.

* * * * *